F. N. MASON.
PACKING.
APPLICATION FILED NOV. 19, 1919.
1,402,943.
Patented Jan. 10, 1922.
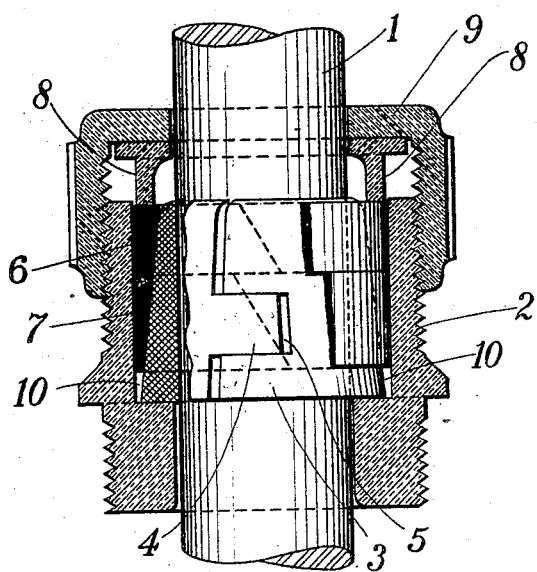
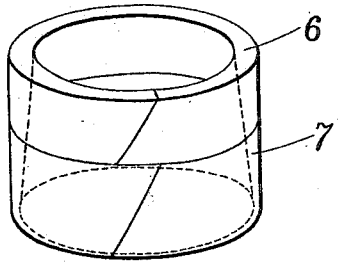
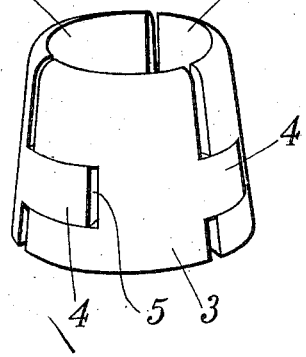
WITNESS
Jo. Baily Brown
Frank N. Mason
INVENTOR
by Winter & Brown
his attorneys

UNITED STATES PATENT OFFICE.

FRANK N. MASON, OF PITTSBURGH, PENNSYLVANIA, ASSIGNOR TO MASON PACKING COMPANY, A CORPORATION OF PENNSYLVANIA.

PACKING.

1,402,943. Specification of Letters Patent. Patented Jan. 10, 1922.

Application filed November 19, 1919. Serial No. 339,110.

*To all whom it may concern:*

Be it known that I, FRANK N. MASON, a resident of Pittsburgh, in the county of Allegheny and State of Pennsylvania, have invented a new and useful Improvement in Packings, of which the following is a specification.

This invention relates to packing designed for use with any mechanism that requires a fluid-tight non-leakable joint around a movable rod. It is particularly adapted for reciprocating members such as piston rods. The object of the invention is to provide a fluid-tight bearing, composed of adjustable bearing segments adapted to contact with the movable member, and a non-metallic packing member surrounding the bearing segments and adapted to keep them in fluid-tight contact with the piston, or other movable member.

Referring to the drawings, Fig. 1 is a longitudinal section of a stuffing box illustrating this invention applied to a piston rod; Fig. 2 is a perspective view of the non-metallic portion of the packing; and Fig. 3 is a perspective view of the bearing segments.

In these drawings the invention is illustrated as applied to a reciprocating piston rod, but it will be understood that it may be applied to the piston of fluid pumps, or to any reciprocal or rotary member with which a fluid-tight joint is necessary.

The packing as illustrated surrounds a piston rod 1, and is carried in a casing 2, adapted to screw into the end of a cylinder head, or other mounting, as will be obvious. The packing comprises two or more bearing segments 3 each of which has a lateral tongue 4, and a corresponding recess 5 on its other side. By this arrangement when the segments are placed in co-operating position, as shown in Fig. 3 the tongues and grooves interfit to break the joints between segments, and so to prevent the escape of fluid therethrough, in well known manner. The interior faces of the segments 3 are cylindrical, so as to fit closely the piston rod 1. The exteriors of the segments are tapered from end to end, as shown clearly in Fig. 1. A non-metallic packing member having a tapered interior, is adapted to fit around the metallic segments, as shown in Fig. 1. This member is illustrated as composed of two split rings 6 and 7, but obviously it may be made of any desired number of rings. Two is a good number, because it permits the gaps in the two rings to be placed on opposite sides, thus breaking the joints and preventing leakage of fluid through the packing member. The packing member is tapered on the inside and is of such thickness that it just fits into the space between the outer wall of the bearing members 3 and the inner wall of the stuffing box casing 2, and is of such length as to permit additional travel as the bearing segments wear thin.

A gland ring 8 is adapted to drive the wedge shaped packing around the bearing segments in obvious manner when the cap 9 is screwed down. Obviously the gland ring may be driven by other suitable means, as by stud bolts through the cap.

The packing member rings are made of such dense non-metallic material such for instance as asbestos or rubber composition, fiber, etc. Such material is hard and not readily distorted by pressure, at the same time it has more resiliency than metal, and exerts a slightly resilient pressure on the entire exterior of the bearing segments. The segments 3 are made of any suitable anti-friction bearing material, such as Babbitt metal, bakelite composition, etc. When the packing member is driven under pressure of the gland ring into the tapered circular recess around the bearing segments, it has a wedge-like function, pressing the latter members against the piston rod 1, and therefore insures a fluid-tight bearing at all times. At the same time the outer wall of the packing is forced tightly against the casing, thus preventing escape of fluid between the casing and packing. As the bearing segments wear they move closer together, in obvious manner, and an occasional turning down of the cap 9 with the consequent driving of the slightly resilient wedge-shaped packing member into the space around the bearing members, insures a constant pressure thereon, and consequently a fluid-tight bearing.

It will be observed that the packing member does not normally extend throughout the space between the segments 3 and the stuffing box wall, but that a space 10 is left beyond the thinner end. This permits the bearing to be tightened even after it has been considerably thinned by wear. The turning down of the stuffing box cap 9, drives the wedge-shaped packing around the bearing segments, and the oppositely disposed tapered bearing and packing members automatically take up any looseness that results from wear. The space 10 permits a considerable amount of such take-up.

This form of packing is highly efficient in cases where a constantly fluid-tight bearing is necessary. It provides a means for taking up looseness of the bearing quickly and certainly, and all of the parts are readily renewable.

Other advantages of the invention will be apparent to those familiar with the art.

I claim:

1. A packing device for moving shafts comprising a plurality of segments adapted to form a bearing, a hard non-metallic packing ring conformed to the exterior of the bearing segments, a casing around the packing ring, and means to exert pressure on the packing ring to drive it around the bearing segments, said segments having tapered exteriors.

2. A fluid-tight packing for moving members comprising bearing segments adapted to fit around the moving members, said bearing segments having cooperating laterally interfitting members, the outer surfaces of the bearing segments being longitudinally tapered, a casing surrounding the bearing segments, a hard elastic tapered packing ring adapted to fit into the casing around the segments, and means to drive the packing ring into the space around the segments against the taper of the bearing members.

3. A packing device for moving members comprising a casing surounding the member, a plurality of interfitting exteriorly-tapered metallic segments adapted to form a bearing for the member, a hard elastic wedge member conformed to fit around the metallic segments, and means to drive the wedge member between the casing and bearing member in a direction opposed to the taper of the bearing segments.

4. A fluid-tight bearing for shafts comprising exteriorly-tapered metallic segments adapted to fit around the shaft and having cooperating laterally interfitting projections, a cylindrical casing surrounding the bearing segments, a hard-non-metallic packing member adapted to fit around the bearing segments, and means to drive the packing member into the tapered space between the casing and bearing segments.

5. A packing device comprising a bearing member adapted to fit about a movable shaft, said bearing members comprising a plurality of interfitting segments having their exterior walls longitudinally tapered, a hard elastic non-metallic packing member tapered to fit the exterior of the said bearing member, a casing adapted to enclose the bearing and packing members, means to drive the packing member between the bearing member and the casing wall, the packing member being shorter than the bearing member and adapted to travel into the space between the casing and bearing member.

In testimony whereof, I have hereunto set my hand.

FRANK N. MASON.

Witnesses:
G. G. TRILL,
HOWARD L. SNIVELY.